(No Model.)
J. C. MICHIE.
WHEEL.
No. 589,784. Patented Sept. 7, 1897.
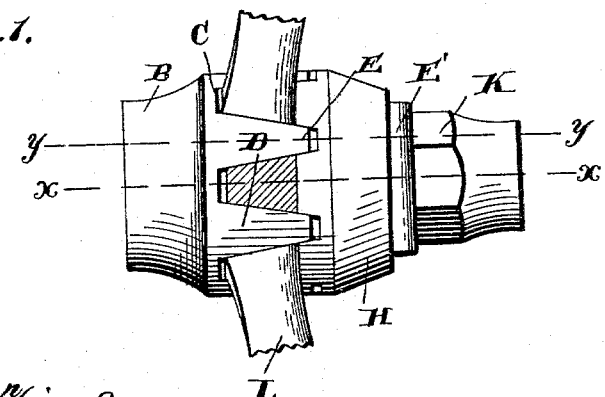
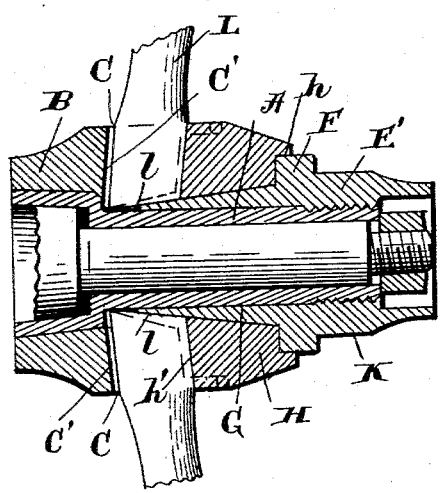
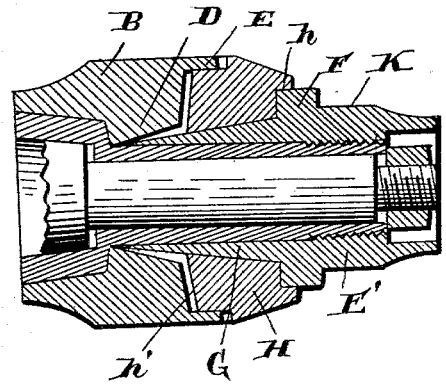
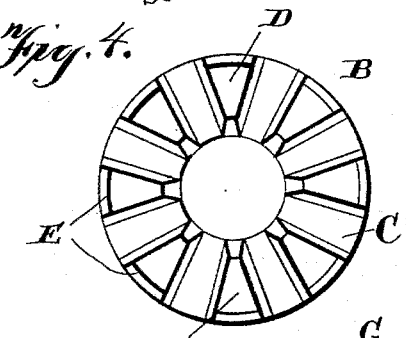
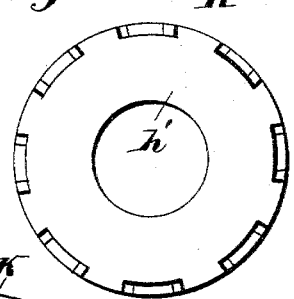
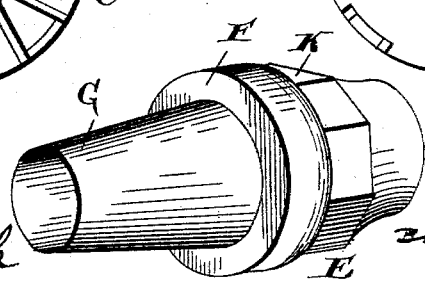
Witnesses
Geo. E. Fisch.
Hubert E. Peck.
Inventor
J. C. Michie,
by Harrison & Nesbit,
Attorneys
THE NORRIS PETERS CO., PHOTO-LITHO., WASHINGTON, D. C.

UNITED STATES PATENT OFFICE.

JAMES C. MICHIE, OF WALDROP, VIRGINIA, ASSIGNOR OF ONE-FOURTH TO THOMAS S. WATSON, OF SAME PLACE.

WHEEL.

SPECIFICATION forming part of Letters Patent No. 589,784, dated September 7, 1897.

Application filed May 13, 1897. Serial No. 636,324. (No model.)

*To all whom it may concern:*

Be it known that I, JAMES C. MICHIE, of Waldrop, in the county of Louisa and State of Virginia, have invented certain new and useful Improvements in Wheels; and I do hereby declare the following to be a full, clear, and exact description of the invention, such as will enable others skilled in the art to which it pertains to make and use it, reference being had to the accompanying drawings, which form part of this specification.

This invention pertains to vehicle-wheels, and relates more particularly to the hub, and has for its object the provision of a simple and improved sectional hub in which the spokes may be placed and from which they may be removed without dismembering the rim or removing the tire therefrom and in which the spokes may be adjusted longitudinally and transversely at will, thus making it possible to keep the wheel always tight.

The invention consists in the novel features of construction and in the combination and arrangement of parts hereinafter fully described and claimed, and illustrated by the accompanying drawings, in which—

Figure 1 is a plan view of the hub. Figs. 2 and 3 are longitudinal sectional views on lines *x x* and *y y*, respectively, of Fig. 1. Fig. 4 is a face view of the hub proper. Fig. 5 is a similar view of the clamping-ring. Fig. 6 is a detail view of the combined spoke-adjusting nut and hub-band.

Box A is enlarged and splined at its rear end as usual, where it is secured in the main portion B of the hub, and the latter is formed with backwardly-tapering sockets C, open at their forward ends, the sockets being separated by integral hub portions D, having at their forward ends the overhanging lips or extensions E. Beneath these extensions the ends of portions D are inclined upward and forward from the inner periphery of the hub and the rear walls C' of the sockets are similarly inclined, said inclined surfaces corresponding with the pitch of the spokes or "dish" of the finished wheel.

The forward portion of box A is screwthreaded to receive the combined spoke-adjusting nut and hub-band E', the same being formed with the central circumferential shoulder F, from which extends the circular wedge or cone G, which projects beneath sockets C and projections D of the hub proper. Clamping-ring H is tapered internally to snugly fit over taper G and is countersunk at *h* on its front or outer face where it embraces shoulder F. The inner face *h'* of the ring is inclined to correspond with the ends of projections D and the rear walls of sockets C and for the same purpose, while its periphery is formed with depressions I, which interlock with lips E, the inner face of the ring abutting the ends of projections D when the hub is adjusted up tight, as will be understood. Adjacent shoulder F is the wrench-hold K, while the forward extremity of the device constitutes the hub-band.

The inner ends of spokes L are beveled at *l*, so as to be flatly engaged by taper of the nut, and the spokes also taper backward transversely in a plane parallel with the longitudinal extent of the hub in order to tightly wedge in tapering sockets C. While the spokes correspond in width with the longitudinal extent of the sockets, so as to force entirely therein when the whole adjustment of the hub is utilized with the clamping-ring in engagement with the projections D, I prefer to have the parts so fitted that the spokes stand out slightly from the sockets when the wheel is first built in order that there may be ample room for adjustment as the parts wear or become loose. The taper of the wedging portion G of the nut and the bevel of the inner ends of the spokes, together with the inclined surfaces of the clamping-ring projections D and the rear walls of the sockets, all combine to incline the spokes and to give the wheel the proper dish. The clamping-nut fitting snugly taper G moves positively therewith, while the nut and ring and the ring and hub proper interlocking, as described, combine to form an extremely strong strain-resisting structure.

The wheel-boxes are so threaded as to have the rotation of the wheels tend constantly to tighten rather than loosen the hub.

Having thus fully described my invention, what I claim as new, and desire to secure by Letters Patent, is—

1. The combination with a box, a hub portion fixed thereto and formed with open end sockets, the box being screw-threaded at its forward end, a nut adjustable on the screw-threaded portion of the box and formed with a circumferential shoulder and an integral tapered portion extending inward from said shoulder, a clamping-ring having a tapered opening and countersunk whereby it is adapted to fit snugly on the taper on the nut and interlock with the shoulder thereof, the ring being adapted to move toward the hub portion and clamp the spokes in the sockets thereof, substantially as shown and described.

2. The combination of the box having the screw-threads at its forward end, the hub portion adapted to be fixed to the rear end of the box and formed with the open end backwardly-tapering sockets, the projections separating the sockets being formed with the overhanging lips and the forward ends of said projections and the rear walls of the depressions being inclined for the purpose specified, the combined nut and hub-band having the integral tapering portion at its inner end adapted to extend beneath the sockets, and at the outer end of said taper formed with the circumferential shoulder, the internally-tapered ring adapted to fit snugly on the taper and countersunk on its outer face to interlock with said shoulder, the inner face of the nut being formed with peripheral depressions to interlock with the said overhanging lips and also inclined to conform to the inclines of the rear walls of the sockets and the projections separating the sockets, the nut adjacent said shoulder being formed with the wrench-hold, and the outer end of the nut constituting a hub-band, all substantially as herein specified and shown.

In testimony whereof I affix my signature in presence of two witnesses.

JAMES C. MICHIE.

Witnesses:
THOMAS G. WALDROP,
S. D. FIELDING.